Sept. 15, 1936.   W. B. CLITHEROW   2,054,595
APPARATUS FOR TEMPERING TUBULAR GLASS ARTICLES
Filed Nov. 4, 1935    2 Sheets-Sheet 1

Inventor.
William Borthwick Clitherow
By Morrison, Kennedy & Campbell
His Attorneys.

Sept. 15, 1936. W. B. CLITHEROW 2,054,595
APPARATUS FOR TEMPERING TUBULAR GLASS ARTICLES
Filed Nov. 4, 1935 2 Sheets-Sheet 2
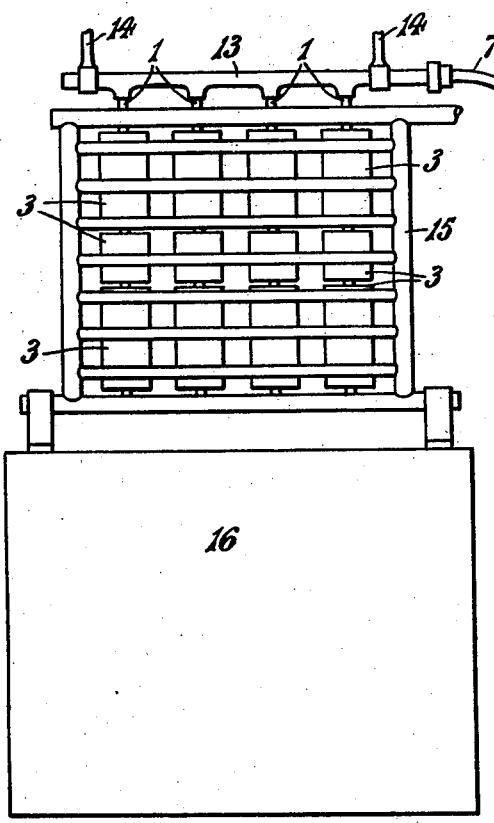
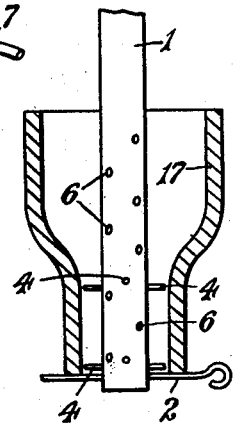
Inventor
William Borthwick Clitherow
By Morrison, Kennedy & Campbell
His Attorneys Patented Sept. 15, 1936

2,054,595

UNITED STATES PATENT OFFICE 2,054,595

APPARATUS FOR TEMPERING TUBULAR GLASS ARTICLES

William Borthwick Clitherow, St. Helens, England, assignor to Pilkington Brothers Limited, Liverpool, England, a limited liability company of Great Britain Application November 4, 1935, Serial No. 48,072
In Great Britain December 4, 1934

2 Claims. (Cl. 49—45)

This invention relates to the tempering of tubular glass articles, and has for its object an improved apparatus whereby a plurality of small tubular articles can be tempered simultaneously.

According to the invention, a plurality of tubular articles are threaded on and supported on a metal tube, each being maintained concentric with the tube by distance pieces; air is supplied to the tube and issues against the inner surfaces of the articles through holes in the tube, whilst the tube, after heating in a furnace, is held in an external blowing frame.

The invention also comprises a tubular furnace and external blowing frame adapted to temper a plurality of articles on a single supporting tube and also an arrangement of a plurality of supporting tubes on a header in a plane adapted for tempering articles in the tempering apparatus employed for flat plates.

In the accompanying drawings:—

Figure 4 shows in elevation a plurality of supported tubes with glass articles thereon in a blowing frame and above a furnace adapted for tempering flat glass plates, and Figure 5 shows the lower part of a supporting frame in elevation, with a tubular glass article in section.

Figure 1:
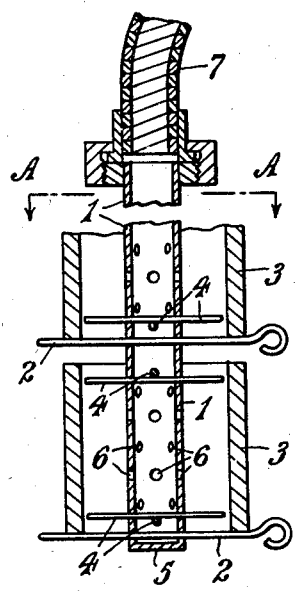
Figure 1 is a vertical section of part of a supporting tube with glass tubes in position.
Figure 2:
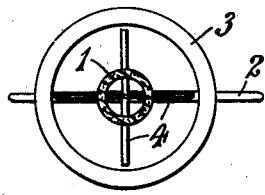
Figure 2 is a section thereof on the line A—A of Figure 1.

The invention will be described with reference to the glass tubes for miner's safety lamps. Referring to Figures 1 and 2, a tube 1, of metal capable of withstanding the temperature of the heating furnace, is provided at intervals with cross pins 2, serving to support a plurality of glass tubes 3, one above the other, surrounding the tube 1. Pins 4, fixed to the tube, serve to keep the glass tubes concentric with the tube 1. The tube 1 which is closed at the bottom 5, is provided with a plurality of holes 6, and is connected at its top end to a flexible pipe 7 through which air is supplied under pressure. The holes 6 are spaced so as to distribute the air blown through them against the inner walls of the tube symmetrically. The cross pins 2 are loose in their holes in the tube 1 so that the glass tubes may be threaded on to the tube 1 from below, a pin 2 being passed through the tube 1 after each glass tube is threaded on.

Figure 3:
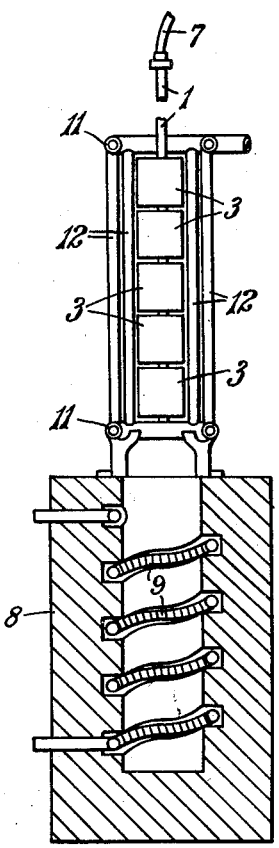
Figure 3 is a vertical cross section of a furnace and blowing frame for a single supporting tube as in Figures 1 and 2, the latter being shown in elevation.

Figure 3 shows a tempering apparatus adapted for tempering glass tubes. The furnace consists of a tube 8 of refractory material, with an electrically heated spiral 9. Above the furnace is a blowing frame consisting of two ring headers 11 with tubes 12 between them, provided with air holes. In operation, the tube 1, with glass tubes 3 threaded on it, is lowered into the furnace, and, when the glass tubes are sufficiently heated, the tube 1 is raised into the position shown in Figure 3 and cooled by admitting air simultaneously into the tube 1 and into the blowing frame 11, 12. Alternatively, the furnace and blowing frame may be moved while the tube 1 remains stationary.

Figure 4 shows an arrangement adapted for tempering glass tubes in the tempering apparatus employed for flat plates. A plurality of tubes 1, each having glass tubes 3 threaded thereon, is connected to a header 13 to which air is supplied. The header 13 is supported by the rods 14. The plurality of tubes 1 with glass tubes 3 is shown in a blowing frame 15 of the construction usual for cooling glass plates, and below the frame 15 is the usual plate heating furnace 16. The plurality of tubes is then manipulated in the same way as a glass plate.

This form of the invention is of great commercial utility, since it enables a large number of small tubular articles to be tempered simultaneously, while making use of the usual flat glass tempering apparatus.

In the case of tubular glass articles of varying diameter, as for instance the tubular articles 17 shown in Figure 5, the air holes 6 in the tube 1, are made of such size and with such spacing as to provide more cooling air at those points where the diameter is greater. Such variation in the air holes is not generally necessary in the external blowing frame, since the cooling effect of the air jets is less on the portions of small diameter by reason of their greater distance from the air holes.

Having described my invention I declare that what I claim and desire to secure by Letters Patent is:—

1. Apparatus for cooling tubular glass articles for tempering them comprising in combination, an external blowing frame, a metal tube on which the articles are threaded, supports on the tube adapted to support the articles, distance pins on the tube adapted to maintain the articles concentric with the tube, air holes in the tube and means for supplying air to the tube.

2. Apparatus for cooling tubular glass articles for tempering them comprising in combination, an external blowing frame, a plurality of metal tubes on which the articles are threaded, supports on each tube adapted to support the articles, distance pins on each tube adapted to maintain the articles concentric with the tube, air holes in each tube, and a header through which air is supplied to the tubes and on which the tubes are fixed in a plane whereby the plurality of tubes is adapted for use in apparatus for tempering glass plates.

WILLIAM BORTHWICK CLITHEROW.